Patented Apr. 3, 1923.

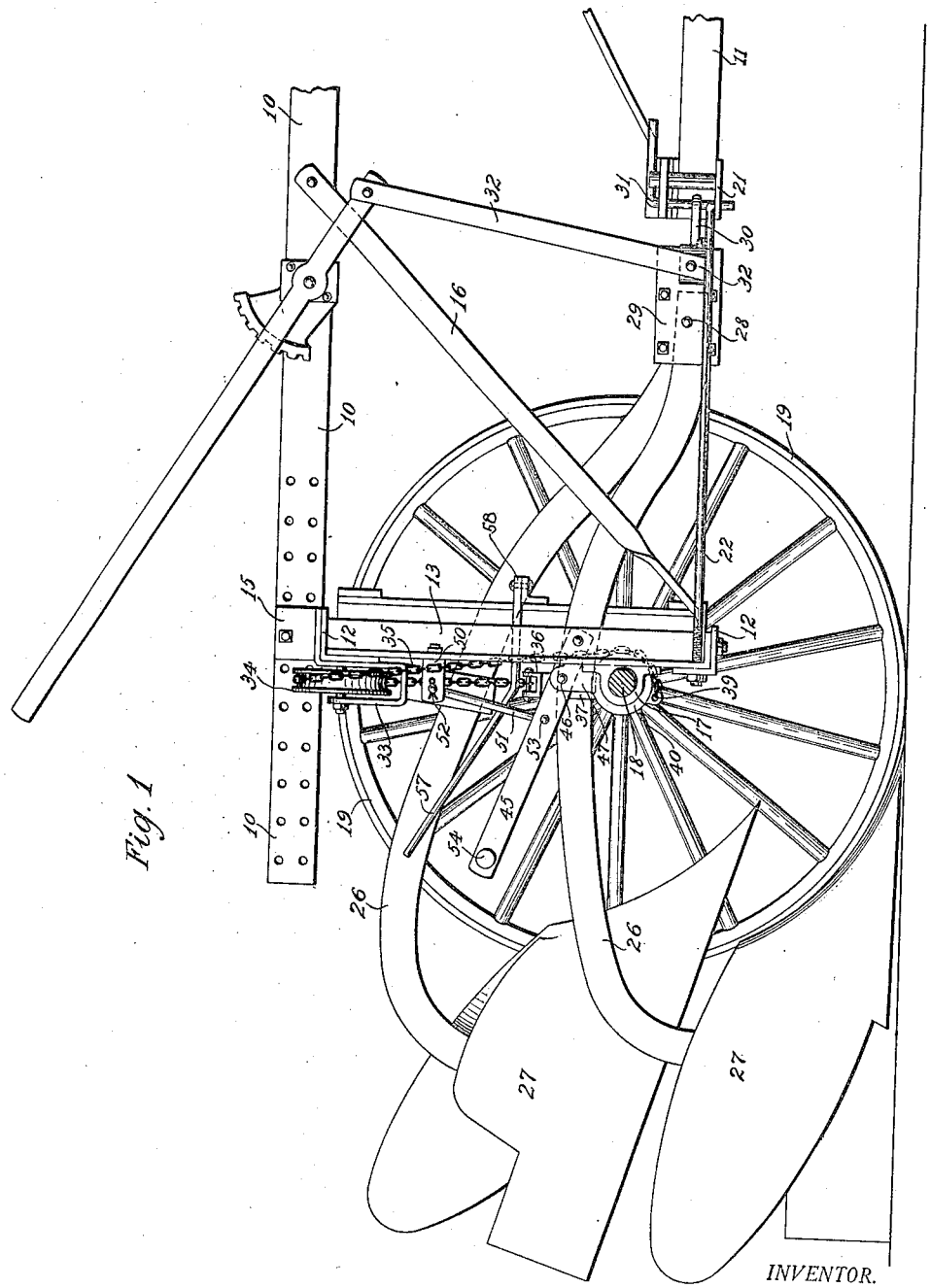

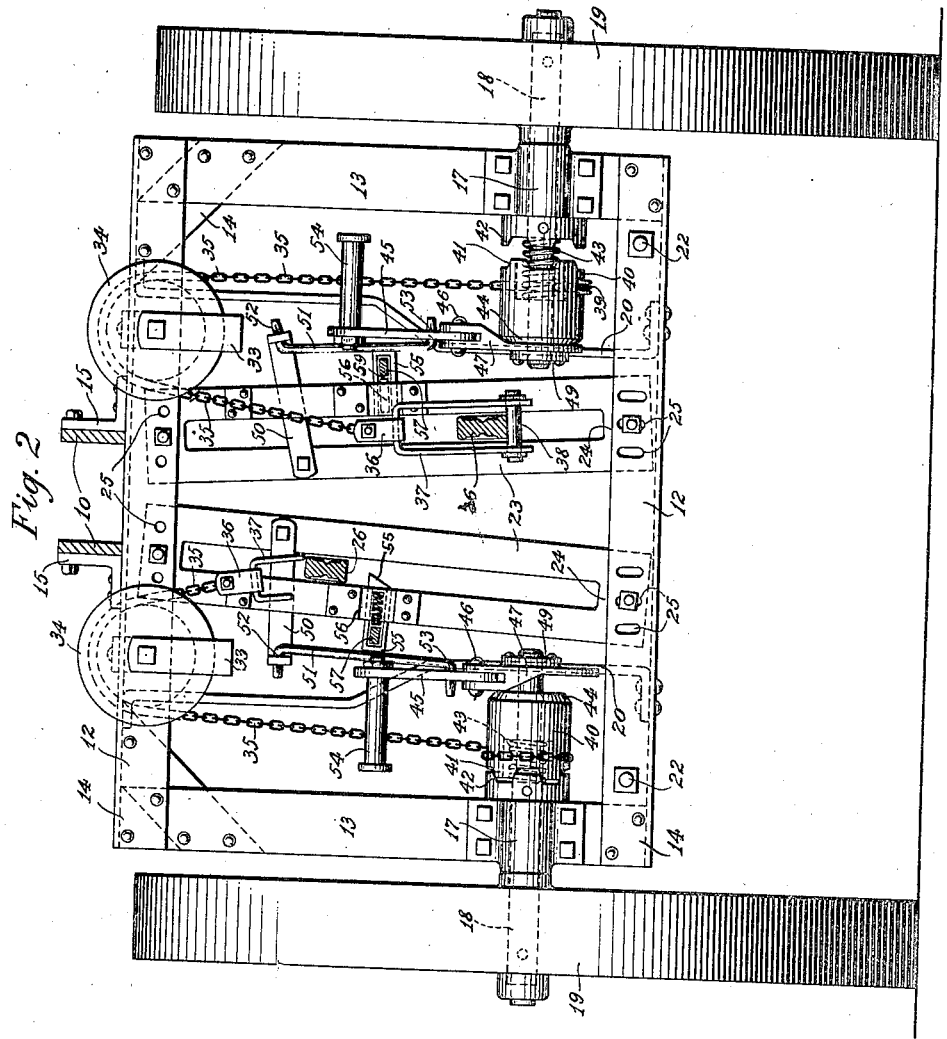

1,450,754

UNITED STATES PATENT OFFICE.

ARTHUR W. REYNOLDS, OF NEWTOWN, CONNECTICUT, ASSIGNOR OF ONE-HALF TO EDWARD BENEDICT, OF NEWTOWN, CONNECTICUT.

POWER LIFT FOR TRACTOR PLOWS.

Original application filed October 14, 1920, Serial No. 416,834. Divided and this application filed January 27, 1921. Serial No. 440,265.

*To all whom it may concern:*

Be it known that ARTHUR W. REYNOLDS, a citizen of the United States, and resident of Newtown, in the county of Fairfield and State of Connecticut, has invented certain new and useful Improvements in Power Lifts for Tractor Plows, of which the following is a specification.

This application is a division of my pending application Serial No. 416,834, for Tractor plows, filed October 14, 1920.

The present invention relates to a power lift for tractor plows, an important object of the invention being to provide a novel and improved power lift whereby a plow beam and its plow member may be raised and lowered when moving forward or backward, as for instance when turning at the ends of furrows.

A further important object is to perfect a simply constructed power lift utilizing the rotation of the wheels of the plow to automatically effect the raising of the plow beam and its plow member, and provided with mechanism whereby said beam and member can be elevated from working position to a fixed point and there released, to be caught and held in inoperative position until intentionally lowered to working position at the will of the driver of the plow.

A still further important object is to devise a power lift capable of use in connection with an adjustable guide member adapted to furnish angular adjustments whereby the plow member may be positioned at any desired angle with respect to the ground, and to incorporate said lift in a frame capable of adjustably supporting said guide member in position to guide the beam of the plow member when it is being raised or lowered.

With these and other important objects in view, the invention resides and consists in the construction and novel combination and arrangement of parts hereinafter more fully described, illustrated in the accompanying drawings and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 is a side elevation of a tractor plow, one of the wheels of the plow being omitted to better show the improved power lift of the invention and the axle being shown in section;

Fig. 2 is a rear elevation of the plow, the plow beams being in section, disclosing a pair of power lifts made in accordance with the principles of the invention and an adjustable guide member associated with each power lift; and Fig. 3 is a sectional detail view of the clutch mechanism of the power lift.

The plow may be attached to a tractor in any desired manner. As shown, it is attached in part to tractor beams, designated 10 and in part to a draw bar support 11 extending from the tractor. A rectangular frame, consisting of horizontally arranged angle irons 12 and vertically arranged angle irons 13 which are secured together at the corners designated 14, is suspended from the tractor beams as by means of angle pieces 15 secured to the upper horizontally arranged angle iron and braces 16 extending from the tractor beams to the lower horizontally arranged angle iron. The vertical angle irons of the frame are provided with bearings 17 in which are journalled short shafts 18 each carrying a wheel 19 by which the frame is supported. The inner ends of shafts 18 are supported in bearings in intermediate members 20 extending across the frame and secured to the upper and lower horizontal angle irons, respectively. Numeral 21 denotes generally a draw bar secured to draw bar support 11, and 22 denotes tie rods connecting the draw bar with the lower horizontal angle iron of the frame and insuring the proper position of said frame.

The rectangular frame is adapted to support adjustable guides for plow beams. I have preferred to show two such guides adapted to care for two plow beams and each comprising a guide yoke consisting of two parallel vertically arranged channel pieces 23 which are tied together by means of short horizontally arranged pieces 24. Holes 25 in the horizontal angle irons provide the means for attachment. The holes in the lower horizontal angle iron of the frame are elongated as shown, so that the lower ends of the guide yokes can be secured to the lower horizontal angle iron by use of any one of the series of holes, thus making it possible to arrange the guide yokes so that they are parallel with, or at any desired angle to, the vertical angle irons of the rectangular frame.

Plow beams 26 are mounted in the guideways of the adjustable guide yokes, thus allowing their plow members 27 to be adjusted at any desired angle with respect to ground to be plowed, and the forward ends of the plow beams are secured to the draw bar in any desired manner. Said forward ends may be pivoted, as denoted at 28, between plates 29 to allow the plow beams to swing upwardly and downwardly on their pivots, and the plates may be secured to the draw bar in any manner to allow the plow beams freedom of movement to conform to the adjustments of the guide yokes, as will be understood. As shown, I prefer to make the connections between the plates and the draw bar by means of clevises 30 pivoted between the plates and adapted to slide upon pin bolts 31 in the draw bar. At 32 is designated generally mechanism connected with the plates, clevises and tractor beams for fixing the forward ends of the plow beams at any desired elevation.

As the power mechanism for raising and lowering the plow members is the same in the case of each plow member, but one set of reference numerals will be necessary in making the description. 33 denotes brackets carried by the upper portion of the rectangular frame of the plow, and 34 denotes pulleys mounted in the brackets. 35 denotes chains one end of each of which is provided with a clip 36 adapted to receive the looped portion of a clevis 37, one for each plow beam. A portion of one of the clevises of Fig. 2 is broken away to better show the latch presently to be described. The plow beams pass between the arms of the clevises, and extending between the arms and below the plow beams are studs each carrying a roller 38 upon which the lower edges of the plow beams are adapted to rest. The chains pass over the pulleys and the opposite end of each chain is secured at 39 to a cylindrical member 40, which members are normally loosely positioned on the inwardly extending portions of the short shafts for the wheels and are provided on their outer ends with male clutch faces 41 adapted to engage female clutch faces 42 fixed on the shafts to turn therewith. 43 denotes a spring normally holding the clutch faces from each other. The inner ends of the cylindrical members are beveled as denoted at 44 for a purpose to be made obvious. Intermediate members 20 pivotally support the lower ends of clutch levers 45.

Pivoted to the clutch levers as indicated at 46 are wedge members 47 having elongated slots 48 through which the wheel shafts freely pass. 49 denotes extensions of intermediate members 20 secured to the lower portion of the rectangular frame and having bearings in which the inner ends of the short shafts are mounted. The inner sides of the wedge members are smooth and continuous and are adapted to slide upon the extensions of intermediate members 20. The working faces of the wedge members normally rest on beveled portions 44 of the cylindrical members. See the wedge member at the right hand side in Fig. 2. 50 denotes horizontally arranged links pivoted to one of the vertical members of each guide yoke and adapted to extend across the guide spaces of said yokes and above the plow beams, and 51 denotes vertically arranged links pivoted to links 50 as denoted at 52 and to the clutch levers as denoted at 53. 54 denotes foot engaging members projecting from the clutch levers.

The arrangement of the cylindrical members and wedge members on the inner portions of the shafts is such that when the wedge members are depressed by means of the clutch levers, the cylindrical members are caused to move outwardly on the shafts so that the clutch faces engage each other. Spring pressed latches 55 are arranged in brackets 56 carried by the guide yokes so that the latches normally extend into the guide spaces of the yokes through which the plow beams pass. 57 denotes plow beam release levers pivoted on the rectangular frame in any desired manner, as denoted at 58, and having engagement with the latches as denoted at 59, in such manner that the plow beam release levers can be manipulated to cause the latches to be entirely removed from the guide spaces for the plow beams.

The method of causing the power lift mechanism to operate to raise and lower the plow members will now be described. When the plow is in use the plow beam is positioned at or near the bottom of its guide yoke, the cylindrical member if free on its shaft and the plow beam is loosely connected by the chain which is secured at one of its ends to the clevis which encloses the plow beam, passes over one of pulleys 34, and is secured at its other end to the cylindrical member. When the clutch lever is depressed the wedge member causes the cylindrical member to slide on the short shaft so that the clutch faces engage each other, and when thus engaged the flat surface of wedge 47 rests against the flat surface of cylindrical member 40, thereby holding the clutch faces together so that they cannot be disengaged until wedge 47 is released. The cylindrical member then turns with the shaft when the tractor is in motion whether moving forward or backward, and the chain winds up on the cylindrical member and thus causes the plow beam to be lifted. The horizontally arranged link on the guide yoke is located at some considerable distance above the spring pressed latch and the latch is so arranged, see Fig. 2, that as the plow beam moves upwardly the latch is pressed away from the guide way to allow the plow beam to pass.

When the plow beam has passed the latch in its upward movement, the latch returns to its normal position. That is it again extends into the guide way. When now the cylindrical member has turned with the shaft until the upper edge of the plow beam engages the horizontal link and causes it to rotate on its pivot, it will, by means of the vertically arranged link which is connected with the clutch lever, cause the wedge member to be elevated to allow the spring in the clutch, with the assistance of the beveled clutch jaws (which naturally force themselves apart when not held) to move the clutch faces apart, so that the cylindrical member will again be free to turn on the shaft. The weight of the plow member and plow beam will cause the plow beam to slide downwardly in the guide way, but the downward movement will be arrested by the latch. See the latch and plow beam at the left hand side in Fig. 2. When now the plow beam release lever is manipulated to remove the latch from the guide way, the plow beam will move to its lowest position in the guide yoke. The horizontally arranged link 50 on the guide yoke will, when lifted by the plow beam, be held in elevated position by means of the vertically arranged link and the wedge member, the spring in the clutch being of sufficient strength to hold the cylindrical member so that its beveled face holds up the wedge member.

Having thus described the invention, what I claim and desire to secure by Letters Patent is:

1. In a plow of the character described, a frame, an upright guide yoke thereon, a plow beam extending through said guide yoke, power mechanism for raising said plow beam, and including a shaft journaled in the frame, a wheel on the shaft for driving the same, a clutch on the shaft disposed in the frame between the wheel and the guide yoke, a chain adapted to be wound by the clutch, and connected to the plow beam, and a pulley on the frame having its axis at right angles to the axis of the clutch and over which the chain passes.

2. In a plow of the character described, a transversely positioned, vertically disposed frame, a guide yoke thereon, a plow beam extending through the guide yoke, a movable and a fixed clutch member carried by said frame, a chain extending between said movable clutch member and said plow beam, a pulley upon said frame and over which said chain passes, and manually operable means for moving said movable clutch member toward said fixed clutch member, and means automatically operable upon raising of the plow beam for disengaging the clutch member.

3. In a plow of the character described, a transversely positioned frame consisting of horizontally and vertically arranged angle irons, a guide yoke extending between said horizontal angle irons, a plow beam extending through the guide yoke, and power mechanism for raising and lowering said plow beam, said mechanism including a clutch member supported upon one of said vertical angle irons, a pulley supported upon one of said horizontal angle irons, and a chain extending between said clutch member and plow beam and passing over said pulley.

4. In a plow of the character described, a frame, a plow beam, a guide for the plow beam, wheels having short shafts on which the frame is supported, a clutch member loosely positioned upon one of said shafts, a clutch member fixed upon said shaft, a chain secured to said loose clutch member and supporting the plow beam, and means for causing said clutch members to engage each other or to be disengaged, said means comprising a wedge adapted to move said members together and a spring for normally holding the members apart.

5. In a plow of the character described, a frame, a plow beam, a guide for the plow beam, wheels having short shafts on which the frame is supported, a clutch on said shaft, a chain secured to said clutch and supporting the plow beam, a pulley supported from the frame and over which the chain passes, a clutch lever for operating the clutch to fix it to the short shaft, and means for operating the clutch lever to make the clutch loose upon said shaft, said means supported upon said guide.

6. In a plow of the character described, a frame, a plow beam, a guide for the plow beam, wheels having short shafts on which the frame is supported, a clutch on said shaft, a chain secured to said clutch and supporting the plow beam, a pulley supported from the frame and over which the chain passes, a clutch lever for operating the clutch to fix it to the short shaft, and means for operating the clutch lever to make the clutch loose upon said shaft, said means comprising a horizontal link pivoted to the guide and extending across the guide space for the plow beam, a vertical link pivoted to the horizontal link and to the clutch lever, said horizontal link adapted to be engaged by said plow beam when elevated and thus caused to swing on its pivot to elevate the clutch lever.

7. In a plow of the character described, a frame, a plow beam, a guide for the plow beam, power mechanism whereby the plow beam may be elevated in the guide, means adapted to automatically release said power mechanism upon elevating of the plow beam, and a latch incorporated in said guide and adapted to allow the plow beam to pass when elevated, but constructed to support the plow beam in elevated position when released, said latch normally projecting into the guide space of the guide for the plow beam and adapted to release the plow beam and permit it to lower by gravity independently of said power mechanism.

8. In a plow of the character described, a frame, a plow beam, an adjustable guide for the plow beam, power mechanism whereby the plow beam may be elevated in the guide, means adapted to automatically release said power mechanism upon elevating of the plow beam, and a latch incorporated in said guide and adapted to allow the plow beam to pass when elevated, but constructed to support the plow beam in elevated position when released, said latch normally projecting into the guide space of the guide for the plow beam and adapted to release the plow beam and permit it to lower by gravity independently of said power mechanism.

9. In a plow of the character described, a frame, a plow beam, a guide for the plow beam, a latch incorporated in said guide and extending into the guide space of the guide, and power mechanism for raising said plow, means adapted to automatically release said power mechanism upon elevating of the plow beam, said latch adapted to recede from said guide space when the plow beam is being elevated and to return to its normal position to support the plow beam in elevated position, and adapted to release the plow beam and permit it to lower by gravity independently of said power mechanism.

10. In a plow of the character described, a frame, a plow beam, a guide for the plow beam, power means for raising said plow beam in said guide, means for automatically releasing said power means when the plow beam is elevated, and a latch incorporated in said guide and adapted to recede from the guide space when the plow beam is being elevated and to enter said space beneath the plow beam when elevated, whereby said latch may support said plow beam in elevated position and adapted to release the plow beam and permit it to lower by gravity independently of said power mechanism.

11. In a plow of the character described, a frame, a plow beam, a guide for said plow beam, means for raising said plow beam in said guide, a latch carried by said guide and extending into the space thereof, said latch adapted to recede from said guide space when said plow beam is being elevated and to extend into said space beneath said plow beam when in elevated position, and plow beam release means adapted to remove said latch from said guide space.

12. In a plow of the character described, a frame, a guide yoke thereon, wheels and short shafts which support the frame, a plow beam freely positioned in the guide yoke, automatic means for raising said plow beam, and means for holding said plow beam in elevated position, said automatic means including a clutch upon one of said shafts, and said means comprising a spring pressed latch normally extending across the guide space of said guide yoke but capable of being removed from said guide space.

13. In a plow of the character described, a frame, a guide yoke thereon, wheels and shafts which support the frame, a plow beam freely positioned in the guide yoke, automatic means for raising the plow beam and for holding the same in elevated position, and means for releasing said plow beam to allow it to fall to its lowermost position, said automatic means including a chain slidably carrying said plow beam, a pulley having its axis at right angles to the axis of said shaft and over which said chain passes, a clutch upon one of said shafts, said chain secured to said clutch, a clutch lever for causing said clutch to engage and disengage said shaft, means for automatically disengaging said clutch upon elevation of the plow beam and a latch incorporated in said guide and adapted to allow said plow beam to travel upwardly and position itself beneath said plow beam to arrest its downward movement, and said means including a plow beam release lever adapted to cause said latch to be withdrawn from beneath said plow beam.

14. In a plow of the character described, a frame, a guide yoke thereon, a plow beam extending through said guide yoke, power means for raising said plow beam, and a manually releasable latch incorporated in said guide yoke and normally extending across the guide space thereof for holding said plow beam in elevated position said plow beam adapted upon release by the latch to move by gravity to its lower position independently of said power means.

15. In a plow of the character described, a frame, a guide yoke thereon, wheels and shafts which support the frame, a plow beam freely positioned in the guide yoke, and automatic means for causing said plow beam to be raised a predetermined distance, said automatic means including a chain slidably carrying said plow beam, a pulley over which said chain passes, a clutch member free on one of said shafts, a wedge member on said shaft adapted to cause said clutch member to be fixed on said shaft, a clutch lever for actuating said wedge member, a horizontal pivoted link extending across the guide yoke and adapted to be engaged by the plow beam in its upward movement, a vertical link pivoted to said horizontal link and to the clutch lever, and means for releasing said clutch member from said shaft, whereby when said plow beam has been raised the predetermined distance, the wedge is removed from the clutch member and the releasing means acts to release the clutch member from the shaft.

Signed this 25th day of January A. D., 1921.

ARTHUR W. REYNOLDS.

Witnesses:
C. M. NEWMAN,
LILLIAN M. ALLING.